United States Patent
Kostin (10) Patent No.: US 10,094,411 B2
(45) Date of Patent: Oct. 9, 2018

(54) ASSEMBLY OF A VEHICLE SEAT WITH A FASTENING DEVICE

(71) Applicant: BROSE FAHRZEUGTEILE GMBH & CO. KOMMANDITGESELLSCHAFT, COBURG, Coburg (DE)

(72) Inventor: Sergej Kostin, Coburg (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 15/302,427

(22) PCT Filed: Mar. 26, 2015

(86) PCT No.: PCT/EP2015/056577
§ 371 (c)(1),
(2) Date: Oct. 6, 2016

(87) PCT Pub. No.: WO2015/155019
PCT Pub. Date: Oct. 15, 2015

(65) Prior Publication Data
US 2017/0067498 A1    Mar. 9, 2017

(30) Foreign Application Priority Data

Apr. 9, 2014   (DE) ................. 10 2014 206 862

(51) Int. Cl.
*F16B 37/00* (2006.01)
*F16B 37/04* (2006.01)
(Continued)

(52) U.S. Cl.
CPC ........... *F16B 37/042* (2013.01); *B60N 2/015* (2013.01); *B60N 2/22* (2013.01); *B60N 2/30* (2013.01); *B60N 2002/684* (2013.01)

(58) Field of Classification Search
CPC ..... B60N 2002/684; B60N 2/015; B60N 2/22; B60N 2/30; F16B 37/042
See application file for complete search history.

(56) References Cited

U.S. PATENT DOCUMENTS 3,123,389 A * 3/1964 Biesecker ................ F16B 5/10
                                                        292/218
3,179,367 A * 4/1965 Rapata .................... F16B 13/04
                                                        248/239
(Continued)

FOREIGN PATENT DOCUMENTS

CN       102459932 A       5/2012
DE        2820218 A1      11/1979
(Continued)

OTHER PUBLICATIONS

Chinese First Office action dated Dec. 5, 2017 cited in corresponding CN Application No. 201580018844.1, 8 pages.
(Continued)

*Primary Examiner* — David M Upchurch
(74) *Attorney, Agent, or Firm* — Lewis Roca Rothgerber Christie LLP (57) ABSTRACT

An assembly of a vehicle seat is provided. The assembly includes a component which includes an opening which is delimited by an opening edge and a fastening device which is to be secured on the component and includes a clamping part and a screw part which is to be connected in a screwing manner to the clamping part. The clamping part includes at least one clamping portion, is insertable into the opening in a direction of insertion and is connectable to the component in a clamping manner as a result of screw-connecting the screw part to the clamping part.

13 Claims, 7 Drawing Sheets

(51) Int. Cl.
*B60N 2/015* (2006.01)
*B60N 2/22* (2006.01)
*B60N 2/30* (2006.01)
*B60N 2/68* (2006.01)

(56) References Cited

U.S. PATENT DOCUMENTS

| | | | | |
|---|---|---|---|---|
| 3,826,458 A | * | 7/1974 | Fisher | F16B 13/04 248/239 |
| 4,129,395 A | * | 12/1978 | Theurer | B60P 7/132 403/317 |
| 4,227,287 A | * | 10/1980 | Gunther | F16B 21/04 411/350 |
| 4,247,219 A | | 1/1981 | Ausprung | |
| 4,813,726 A | * | 3/1989 | Ravinet | A47B 95/00 292/204 |
| 4,936,066 A | * | 6/1990 | Rutsche | F16B 5/10 24/289 |
| 5,044,679 A | * | 9/1991 | Barnes | E05B 35/008 292/207 |
| 5,123,795 A | * | 6/1992 | Engel | F16B 5/10 411/552 |
| 5,188,324 A | * | 2/1993 | Joseph | A47B 96/068 248/222.52 |
| 5,970,835 A | * | 10/1999 | Kenyon | B23D 47/025 144/1.1 |
| 6,237,970 B1 | | 5/2001 | Joannou | |
| 6,575,682 B1 | * | 6/2003 | Dohm | F16B 21/02 411/349 |
| 6,676,176 B1 | * | 1/2004 | Quandt | E05L 39/08 292/202 |
| 6,988,863 B2 | * | 1/2006 | Hulin | F16B 21/02 411/3 |
| 7,338,244 B2 | * | 3/2008 | Glessner | F16B 5/0208 411/349 |
| 7,491,025 B2 | * | 2/2009 | Tangeman | A61G 13/0018 24/590.1 |
| 7,955,038 B2 | * | 6/2011 | Silbereisen | F16B 19/008 24/663 |
| 8,342,328 B2 | * | 1/2013 | Trapp | B65D 73/0014 206/477 |
| 8,353,397 B2 | * | 1/2013 | Trapp | B65D 73/0014 206/1.5 |
| 8,915,321 B2 | * | 12/2014 | Lejeune | B60K 1/04 180/68.5 |
| 2003/0039529 A1 | * | 2/2003 | Ward | F16B 37/042 411/173 |
| 2009/0028660 A1 | * | 1/2009 | Csik | F16B 5/0208 411/103 |
| 2013/0112843 A1 | * | 5/2013 | Young | F16F 15/04 248/636 |

FOREIGN PATENT DOCUMENTS

| | | |
|---|---|---|
| DE | 19838560 A1 | 3/2000 |
| EP | 0268510 A1 | 5/1988 |
| EP | 0268510 B1 | 3/1991 |
| EP | 1114256 B1 | 7/2002 |
| EP | 2634039 A1 | 9/2013 |
| GB | 561215 | 5/1944 |
| JP | 2012241761 A | 12/2012 |
| KR | 10-2010-0120768 | 11/2010 |
| WO | WO 2010/149279 A1 | 12/2010 |

OTHER PUBLICATIONS

Korean Office action dated Jan. 29, 2018 cited in corresponding Korean Application No. 10-2016-7029597, 10 pages.

* cited by examiner

ASSEMBLY OF A VEHICLE SEAT WITH A FASTENING DEVICE

CROSS-REFERENCE TO A RELATED APPLICATION

This application is a National Phase Patent Application of International Patent Application Number PCT/EP2015/056577, filed on Mar. 26, 2015, which claims priority of German Patent Application Number 10 2014 206 862.2, filed on Apr. 9, 2014.

BACKGROUND

The invention relates to an assembly of a vehicle seat as well as to a method for mounting an assembly of a vehicle seat.

Such an assembly includes a component which comprises an opening which is delimited by an opening edge. A fastening device, which comprises a clamping part and a screw part which is to be connected in a screwing manner to the clamping part, is to be secured on the component, wherein the clamping part comprises at least one clamping portion, is insertable into the opening in a direction of insertion and is connectable to the component in a clamping manner as a result of screw-connecting the screw part to the clamping part.

Such a fastening device serves for fastening two parts of a vehicle seat together in a screw-connecting manner. For example, by means of a such a fastening device, a pivot element can be pivotably connected to a component, for example to a seat frame or a guide rail.

Generally speaking, when such a fastening device is mounted on an associated component, there is a need for simple assembly, low costs and a high-quality, permanent connection. The provision of a threaded passage on a component into which a screw is able to be screwed in order to connect a pivot element, for example, to the component in this way so that it is able to pivot, has traditionally been provided. Weld nuts, piercing nuts or rivet nuts have been provided as an alternative to this but they can involve additional costs and greater expenditure on assembly on account of additional assembly steps (for example for welding or riveting).

Outside the area of vehicle seats, where a fastening device has to be mounted on a rail (for example a curtain rail), inserting a clamping part through a rail slot into the rail and producing a clamping connection between the clamping part and the rail as a result of screwing a nut onto a threaded shank which is connected to the clamping part, is known. In the case of such traditional, known fastening devices, however, inserting the clamping part into the rail can be awkward and inconvenient, which can make the assembly more difficult.

SUMMARY

It is an object of the present invention to provide an assembly for a vehicle seat and a method for mounting such an assembly, both of which enable convenient assembly of a simple, fixed fastening device to be secured on a component.

Said object is achieved by an article with the features as described herein.

Accordingly, in a first rotational position the clamping part is insertable into the opening and, for clamping with the component, is rotatable in a direction of rotation about the direction of insertion from the first rotational position into a second rotational position, in which the at least one clamping portion of the clamping part is movable into abutment with a wall portion of the component, which surrounds the opening. The clamping part comprises at least one stop portion which, in the second rotational position, is in abutment with the opening edge of the opening and blocks the clamping part from being rotated in the direction of rotation beyond the second rotational position.

The present invention proceeds from the concept of providing a fastening device for securing on a component of a vehicle seat, said fastening device creating a clamping connection to the component. The clamping part of the fastening device is able to be inserted into the opening formed on the component by the clamping part being pushed through the opening. Said insertion into the opening is (only) possible with the clamping part in a first rotational position. For the clamping connection of the clamping part to the component, the clamping part can then be moved out of the first rotational position in a direction of rotation about the direction of insertion into the second rotational position, in which a clamping portion of the clamping part does not coincide with the opening of the component (any longer), but rather overlaps a wall portion of the component which surrounds the opening such that the clamping part is able to be connected in a clamping manner to the wall portion.

The second rotational position is defined by at least one stop portion of the clamping part which passes into abutment with the opening edge of the opening when transferred into the second rotational position and consequently prevents the clamping part from rotating beyond the second rotational position. As a result of rotating the screw part further in the direction of rotation relative to the clamping part, the screw part is able to be screw-connected to the clamping part and a clamping connection between the fastening device and the component is produced as a result.

By the at least one stop portion passing into abutment with the opening edge, the clamping part is able to be realized in a comparatively small manner in an axial dimension. In particular, no stop portions have to be provided to abut with other walls of the component, which extend, for example, perpendicular with respect to the wall portion that bears the opening, for example a guide rail.

In addition, the opening with its opening edge can be formed in an exact manner in the component.

Consequently, an exact abutment contour can be provided on the opening edge which enables a defined abutment of the at least one stop portion in the second rotational position such that the second rotational position is able to be pre-defined in an exact manner.

The supporting of the abutment portion against the opening edge additionally enables direct support in the region of the opening of the component without the specific form of adjoining walls, for example curvature radii and tolerances of other walls, having to be taken into account.

For fastening the fastening device on the component, the clamping part is inserted into the opening of the component and pushed through the opening for this purpose. The opening, in this connection, is preferably delimited circumferentially by the opening edge such that the opening edge is closed circumferentially and encloses the opening.

The clamping part preferably comprises a head, the form of which in cross section transversely with respect to the direction of insertion corresponds to the form of the opening of the component. The form of the head of the clamping part just as the form of the opening deviates in cross section transversely with respect to the direction of insertion from a circular form. This ensures that by rotating the head of the clamping part relative to the opening, portions of the head can be moved to overlap the opening edge in order to connect the clamping part to the components in this manner and in particular to hold the clamping part on the component in opposition to the direction of insertion.

For example, the head of the clamping part just as the opening of the component, in cross section transversely with respect to the direction of insertion, can comprise a substantially triangular form, the corners being able to be rounded off. On account of the form of the clamping part at its head and the form of the opening in cross section being substantially congruent, in the first rotational position in which the head and the opening are moved to coincide, the head of the clamping part is able to be pushed through the opening.

On account of the form of the opening just as the form of the head deviating from a circular form, the head is able to be moved out of coincidence with the opening as a result of rotating the clamping part in the direction of rotation relative to the opening such that the head protrudes in portions beyond the opening edge which delimits the opening and, as a result, the clamping part is prevented from being pulled out of the opening in opposition to the direction of insertion.

One or several clamping portions, which are arranged on a side of the head which faces the wall portion of the component when the clamping part is inserted into the opening, are realized, for example, on the head of the clamping part. The clamping portions can be realized, for example, in corner regions of the head of the clamping part which deviates in cross section transversely with respect to the direction of insertion from a circular form. For producing a clamping connection to the component, the clamping part passes into abutment with the wall portion of the component at the clamping portions such that the clamping part is held on the wall portion by means of the clamping portions.

In a first embodiment, the screw part comprises a threaded shank, which, for screw connection, can be screwed into a threaded opening of the clamping part.

The screw part, in this case, is developed as a screw and can be screwed into the clamping part which is realized in the manner of a nut.

As an alternative to this—in a kinematic reversal—in a second embodiment the clamping part can comprise a threaded shank which, for screw connection, can be screwed into a threaded opening of the screw part. In this case, the clamping part is realized in the manner of a screw and the screw part in the manner of a nut, it being possible to screw the screw part onto the threaded shank of the clamping part for the clamping connection of the fastening device on the component.

To fasten the fastening device on the component, the clamping part is inserted into the opening in its first rotational position. The clamping part is then rotated relative to the opening in the direction of rotation and as a result at least one clamping portion is moved to overlap the opening edge of the opening of the component. The screw part, in this connection, is preferably already fitted onto the clamping part in its pre-mounted position such that the rotation of the clamping part out of the first rotational position into the second rotational position can be brought about as a result of acting on the screw part, for example by means of a suitable screwdriver. If the clamping part has reached its second rotational position and if the at least one stop portion of the clamping part is in defined abutment with the opening edge, the screw part is able to be rotated further in the direction of rotation relative to the clamping part in order to screw-connect the screw part and the clamping part together and in particular to produce clamping between the clamping part, the component and the screw part.

In order to ensure that when the screw part is acted upon for rotating the clamping part out of the first rotational position into the second rotational position (when the clamping part is inserted into the opening), the clamping part is (initially) entrained with the screw part, the threaded engagement between the screw part and the clamping part has to be developed in a sufficiently stiff manner. At all events, the threaded engagement between the screw part and the clamping part has to be so stiff that the clamping part is entrained as far as its second rotational position when the screw part is rotated. After defined abutment of the at least one stop portion of the clamping part against the opening edge of the opening, a relative movement between the screw part and the clamping part is then effected when the screw part is rotated further in the direction of rotation in order to produce a clamping connection to the component.

Various measures are conceivable and possible in order to provide sufficient stiffness between the clamping part and the screw part. For example, the thread form of a thread on the screw part can deviate (slightly) from a thread form of a thread on the clamping part. Or a thread of the screw part and/or of the clamping part can comprise a coating which provides a stiffness for the thread engagement between the screw part and the clamping part.

In an advantageous development, the clamping part and/or the screw part comprise a trilobular thread. The term "trilobular" is to be understood as a geometric figure which is also called a "triangle-round". It comprises a triangular basic form with a constant roll diameter. Such threads are self-locking and secure the rotational position of the screw part relative to the clamping part (so-called "mechanically self-securing thread").

The screw part preferably also comprises a clamping portion which can extend, for example, as a ring-shaped clamping face on a head of the screw part or also on a bearing portion for the bearing of a pivot element. With the clamping part inserted into the opening, the clamping portion of the screw part comes to rest on a first side of the wall portion, whilst the at least one clamping portion of the clamping part is arranged on a second side of the wall portion which is remote from the first side. The wall portion is consequently received between the clamping portion of the screw part and the at least one clamping portion of the clamping part when the clamping part is situated in its second rotational position and consequently does not coincide with the opening of the component. As a result of screwing the screw part into or onto the clamping part, a clamping connection between the connected unit, produced from the clamping part and the screw part, and the wall portion can consequently be created.

The clamping part comprises at least one first stop portion, which defines the second rotational position, by being in abutment with the opening edge of the opening in the second rotational position and consequently preventing the clamping part from rotating in the direction of rotation beyond the second rotational position. In addition, the clamping part preferably comprises at least one further second stop portion which is in abutment with the opening edge of the opening in the first rotational position. By means of the further second stop portion, the first rotational position is consequently defined by the second stop portion preventing the clamping part rotating in opposition to the direction of rotation beyond the first rotational position. The clamping part can consequently be rotated exclusively between its first rotational position and its second rotational position, a movement of the clamping part through the opening being possible in the first rotational position, whilst in the second rotational position a clamping connection is able to be produced between the fastening device and the component.

A fastening device of the type described previously which is secured on the component of the vehicle seat is able to be used in various ways.

Thus, in one variant it is conceivable and possible for the fastening device to serve the purpose of bearing a pivot element in a pivotable manner on the component. To this end, the fastening device comprises, for example on the screw part, a cylindrical bearing portion which reaches through an opening of the pivot element and, as a result, provides a pivotable bearing arrangement of the pivot element on the component.

As an alternative to this or in addition to it, such a bearing portion is also able to be provided on the clamping part.

In a second variant, it is also conceivable and possible for such a fastening device to form a stop for delimiting an adjustment path of an adjustment device, the component being a constituent part thereof. The fastening device consequently serves as a stopper and prevents an adjustment part being able to be adjusted beyond the fastening device. As a result of the fastening device being able to be fastened, for example in a releasable manner, at various openings of the component, the fastening device can provide, in this way, a variably predefinable stop.

For example, such a fastening device, which serves as a stop, can be mounted on a guide rail of a longitudinal adjustment device of a vehicle seat, the fastening device being fitted, for example, on a bottom of a guide rail in such a manner that the clamping part or the screw part projects into the adjustment path of the adjustment part and consequently prevents the adjustment part being adjusted along the guide rail beyond the fastening device.

The object is also achieved by a method for mounting an assembly of a vehicle seat. The assembly includes:
  a component which comprises an opening which is delimited by an opening edge, and
  a fastening device which is to be secured on the component and comprises a clamping part and a screw part which is to be connected in a screwing manner to the clamping part.
  The clamping part comprises at least one clamping portion, is insertable into the opening in a direction of insertion and is connected to the component in a clamping manner as a result of screw-connecting the screw part to the clamping part.
In this case, it is provided that in a first rotational position, the clamping part is inserted into the opening and, for clamping with the component, is rotated in a direction of rotation about the direction of insertion from the first rotational position into a second rotational position, in which the at least one clamping portion of the clamping part is movable into abutment with a wall portion of the component, which surrounds the opening, wherein when the clamping part is rotated into the second rotational position, at least one stop portion of the clamping part moves into abutment with the opening edge of the opening and, as a result, blocks the clamping part from being rotated in the direction of rotation beyond the second rotational position.

The advantages described beforehand for the assembly and the advantageous developments are also applied analogously to the method such that reference is to be made to the above statements.

For the clamping connection of the fastening device to the component, the clamping part is inserted in the direction of insertion into the opening. The clamping part is situated, in this connection, in its first rotational position and, after being inserted into the opening, is rotated out of the first rotational position in the direction of rotation into the second rotational position. The screw part which is fitted onto the clamping part is engaged for this purpose. The clamping part is entrained when the screw part is rotated and is consequently transferred into its second rotational position. Once the clamping part has reached its second rotational position, the screw part is moved further in the direction of rotation and, as a result, is rotated relative to the clamping part such that the screw part is screwed into or onto the clamping part in order to produce a clamping connection between the clamping part, the screw part and the wall portion located in between.

BRIEF DESCRIPTION OF THE DRAWINGS

The concept underlying the invention is to be explained in more detail below by way of the exemplary embodiments shown in the figures.

DETAILED DESCRIPTION

FIGS. 1 to 4A-4C show a first exemplary embodiment of an assembly 1 including a component 10 of a vehicle seat, a fastening device 2 and a pivot element 11 which is to be mounted so as to be pivotable on the component 10 of the vehicle seat.

Figure 1:
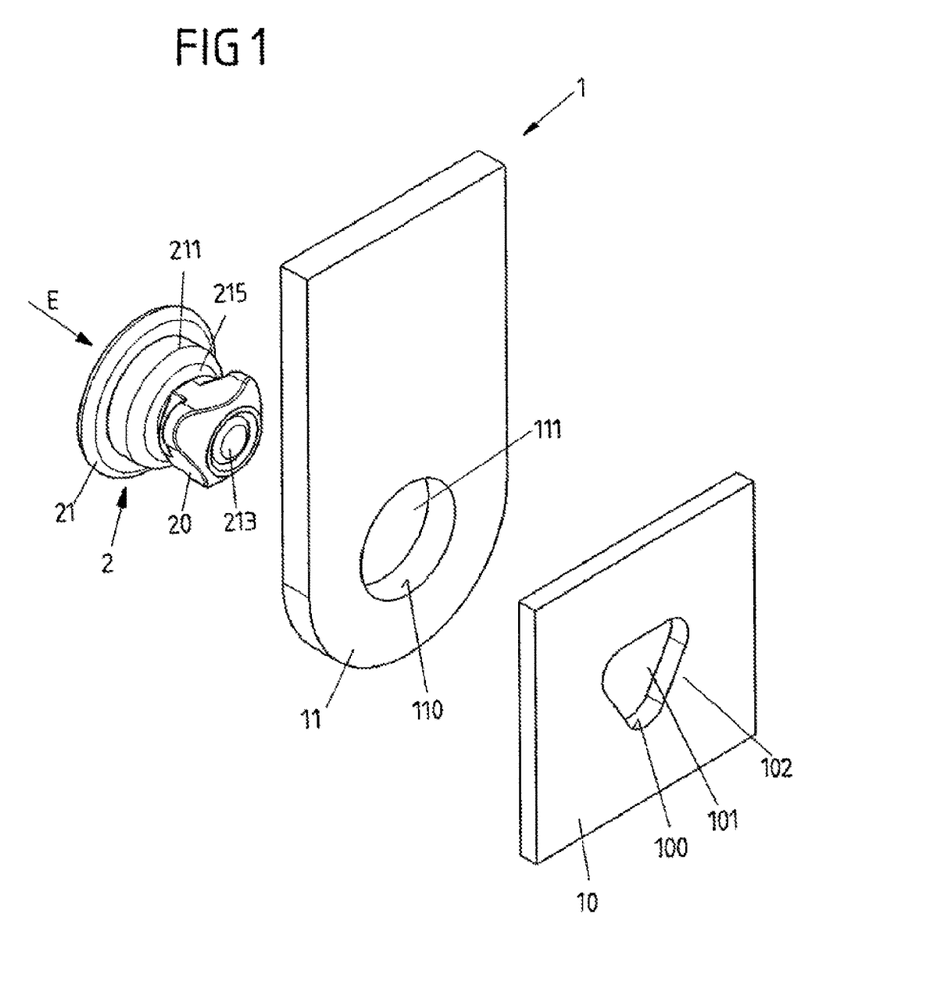
FIG. 1 shows a view of an assembly including a component, a fastening device to be secured thereon and a pivot element which is mounted on the component by means of the fastening device.

The component 10 can be, for example, a constituent part of a seat frame or of a guide rail of the vehicle seat and comprises an opening 101 which is delimited by a circumferentially closed opening edge 100. The pivot element 11, for example a rocker arm of a seat height adjustment means, is to be mounted on the component 10 so as to be pivotable.

The fastening device 2, which is developed in two parts from a clamping part 20 and a screw part 21 which is to be connected in a screwing manner to the clamping part 20, serves this purpose. The fastening device 2 can be inserted with the clamping part 20 into the opening 101 of the component 10 and, in the mounted position, reaches through an opening 111 of the pivot element 11 which is surrounded by a circumferential opening edge 110 such that a cylindrical bearing portion 211 of the screw part 21 of the fastening device 2 comes to rest in the opening 111 of the pivot element 11 and the pivot element 11 is consequently mounted on the bearing portion 211 so as to be pivotable.

Figure 4A:
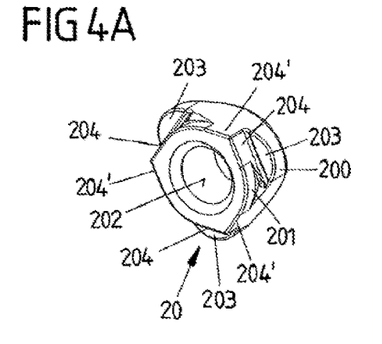
FIG. 4A shows a separate view of a clamping part of the fastening device according to a first exemplary embodiment.

As can be seen from the separate view according to FIG. 4A, the clamping part 20 is realized in the manner of a nut and comprises a head 200 and a threaded opening 202 that is formed therein. An engagement portion 201 which, with the clamping part 20 correctly inserted into the opening 101 of the component 10 (see FIGS. 2A, 2B), is arranged in the opening 101 and is in abutment in portions with the opening edge 100 of the opening 101, is on the rear side of the head 200.

The engagement portion 201 carries stop portions 204, 204'. Clamping portions 203 are also realized on the rear side of the head 200.

Figure 4B:
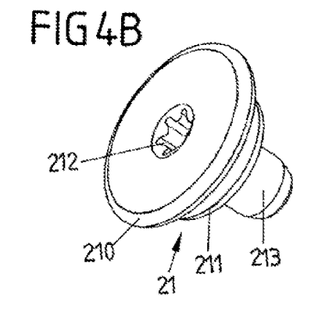
FIG. 4B shows a separate view of a screw part of the fastening device.

The screw part 21 comprises a head 210 and a tool engagement point 212, which is arranged centrally thereon, for engagement for a tool, for example a screwdriver. The bearing portion 211, from which a threaded shank 213 protrudes, connects to the head 210. The threaded shank 213 can be screwed into the threaded opening 202 of the clamping part 20 in order to connect the screw part 21 to the clamping part 20.

Figure 4C:
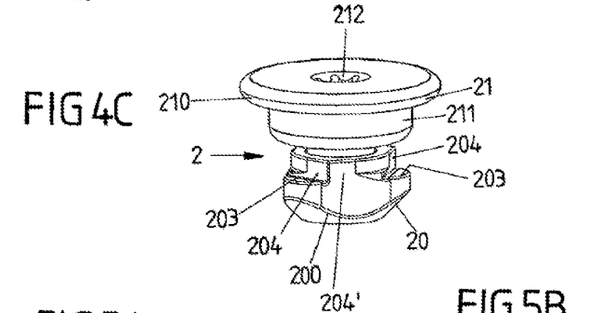
FIG. 4C shows a view of the fastening device with the screw part pre-mounted on the clamping part.

In the pre-mounted position, shown in FIG. 4C, the screw part 21 is screwed with its threaded shank 213 partially into the threaded opening 202 of the clamping part 20 and is consequently fitted onto the clamping part 20. The fastening device 2 is produced, for example, by a supplier in said pre-mounted position and, at the site of a seat manufacturer, can be connected in the correct manner to a component 10 of a vehicle seat.

Figure 2A:
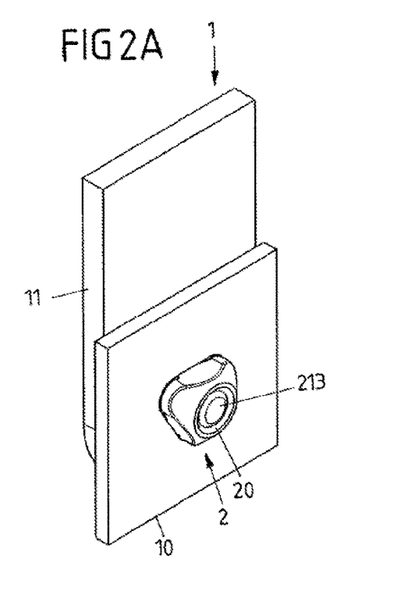
FIG. 2A shows a view of the assembly with the fastening device inserted into an opening of the component, in a first rotational position of the fastening device.

For mounting on the component 10 for the pivotable bearing arrangement of the pivot element 11, the fastening device 2 is pushed in a direction of insertion E through the opening 111 of the pivot element 11 and the opening 101 of the component 10 in such a manner that the head 200 of the clamping part 20 comes to rest on a side of the component 10 that is remote from the pivot element 11, as is shown in FIG. 2A. For inserting the fastening device 2 into the opening 101 of the component 10, the clamping part 20 is situated, in this connection, in a first rotational position, in which the head 200 of the clamping part 20 coincides with the opening 101 of the component 10.

Figure 3A:
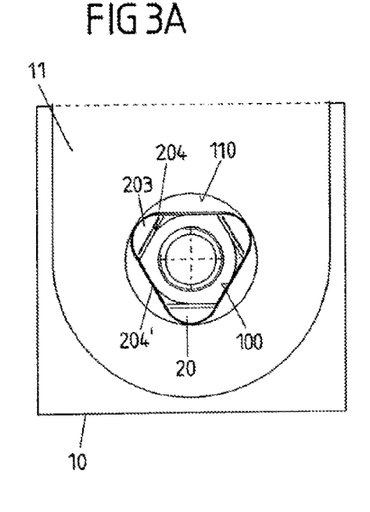
FIG. 3A shows a view of the assembly without a screw part of the fastening device, with a clamping part of the fastening device in the first rotational position.

As can be seen, for example, from FIG. 3A, in cross section transversely with respect to the direction of insertion E, the head 200 and the opening 101 of the component 10 comprise substantially the same form. In the first rotational position of the clamping part 20, the head 200 of the clamping part 20 and the opening 101 of the component 10 coincide with one another, as is shown in FIG. 3A, such that the clamping part 20 is able to be guided with its head 200 through the opening 101 of the component 10.

Once the clamping part 20 is inserted into the opening 101, the stop portions 204' of the engagement portion 201 of the clamping part 20 are in abutment with the opening edge 100 of the opening 101 of the component 10. The stop portions 204' consequently define the first rotational position, in which position (exclusively) the clamping part 20 is able to be inserted into the opening 101.

Figure 2B:
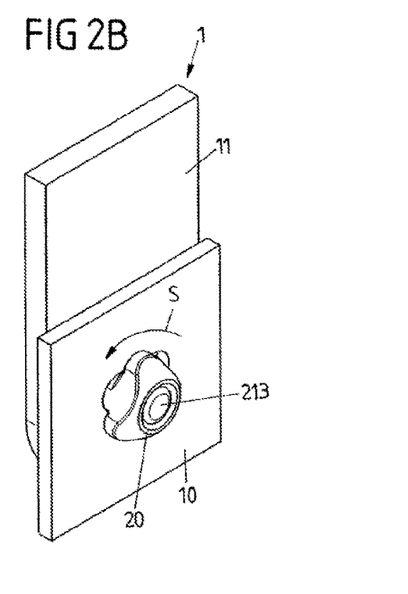
FIG. 2B shows the view according to FIG. 2A but in a second rotational position of the fastening device.
Figure 3B:
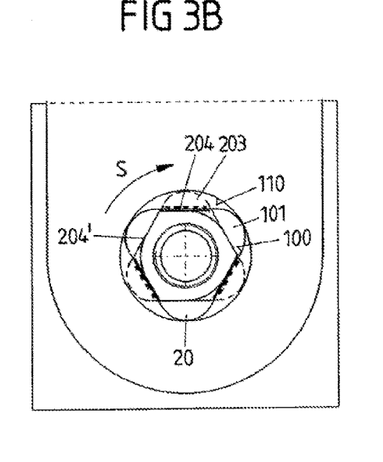
FIG. 3B shows the view according to FIG. 3A but with the clamping part in the second rotational position.

For fastening the fastening device 2 on the component 10, once the clamping part 20 is inserted, engagement can be made on the screw part 21 by means of the tool engagement point 212 in order to rotate the screw part 21 in a direction of rotation S (see FIGS. 2B and 3B) relative to the component 10. The threaded engagement between the screw part 21 and the clamping part 20 is developed stiffly in such a manner that when the screw part 21 is rotated, the clamping part 20 is entrained in the direction of rotation S and is consequently rotated into a second rotational position, shown in FIGS. 2B and 3B. In said second rotational position, the head 200 of the clamping part 20 does not coincide with the opening 101 of the component 10 (any longer) such that the clamping portions 203 which are realized at the back of the head 200 engage over the opening edge 100 of the opening 101, as is shown in FIGS. 2B and 3B (the views according to FIGS. 3A and 3B show a view from the side of the pivot element 11, the screw part 21 being removed and not being shown so as to simplify the overview; the views according to FIGS. 3A and 3B consequently show essentially the clamping part 20 relative to the opening 101 of the component 10).

In the second rotational position, the stop portions 204 of the engagement portion 201 are in abutment with the opening edge 100 of the opening 101. The stop portions 204 consequently define the second rotational position. On account of the stop portions 204 being in abutment with the opening edge 100, the clamping part 20 is not able to be rotated in the direction of insertion S beyond the second rotational position, but is held on the component 10 in its second rotational position if the screw part 21 is rotated further in the direction of insertion S. As a result of rotating the screw part 21 in the direction of insertion S, the screw part 21 is consequently able to be screw-connected to the clamping part 20 such that the clamping portions 203 and a ring-shaped clamping portion 215, which is realized on the bearing portion 211 of the screw part 21, are moved into clamping abutment with the component 10 and the fastening device 2 is consequently secured on the component 10.

In the mounted position, the screw part 21 and the clamping part 20 receive a wall portion 102 of the component 10 in a clamping manner between them such that the fastening device 2 is held non-rotatably on the component 10.

For releasing the fastening device 2 from the component 10, the screw part 21 can be rotated in opposition to the direction of rotation S. As a result, the clamping between the connected unit, which is produced from the screw part 21 and the component 10, is first of all lifted, and the clamping part 20 is then entrained with the screw part 21 in opposition to the direction of rotation S such that the clamping part 20 passes into the first rotational position (FIG. 2A). As a result, the stop portions 204' move into abutment with the opening edge 100 and cause the fact that the clamping part 20 is not able to be moved in opposition to the direction of rotation S beyond the first rotational position. The head 200 of the clamping part 20 consequently coincides once again with the opening 101 of the component 10 such that the fastening device 2 is able to be removed from the component 10 in opposition to the direction of insertion E.

In order to enable the clamping part 20 to be fastened on the component 10, it is basically necessary for the form of the opening 101 of the component 10 and the form of the head 200 of the clamping part 20 to deviate from a circle. The opening 101 and the head 200 of the clamping part 20, in this connection, are identical in form in such a manner that the clamping part 20 is able to be guided with its head 200 through the opening 101 in the first rotational position. In the second rotational position, the head 200 of the clamping part 20 does not coincide, however, with the opening 101 and can consequently not be guided through the opening 101 in opposition to the direction of insertion E.

In the case of the specific exemplary embodiment, both the opening 101 and the head 200 of the clamping part 20 comprise a triangular form (with rounded edges) in cross section transversely with respect to the direction of insertion E. In a corresponding manner, the clamping part 20 comprises three clamping portions 203 as well as three first stop portions 204 and three second stop portions 204' for defining the first rotational position and the second rotational position.

So that the clamping part 20 is entrained when the screw part 21 is rotated in the direction of rotation S, it is necessary for the threaded engagement between the screw part 21 and the clamping part 20 to be sufficiently stiff. To this end, the threaded shank 213 of the screw part 21 and/or the threaded opening 202 of the clamping part 20 can each comprise a trilobular thread G (see FIG. 11) which, with a constant roll diameter D, deviates in its contour K from a circle. So-called trilobularity is described, in this connection, by the ratio between an enveloping outside circle A and an inside circle I.

Figure 11:
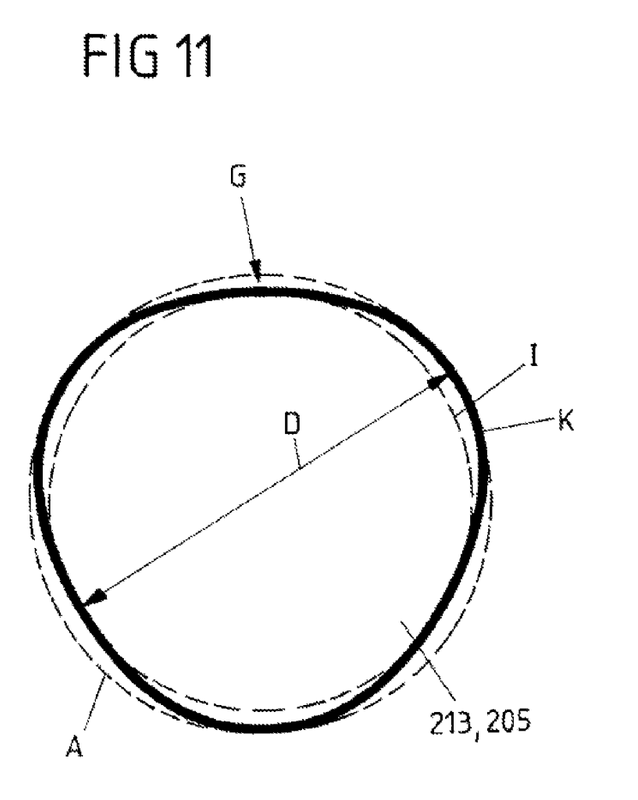
FIG. 11 shows a schematic view of a trilobular thread.

A trilobular thread is a self-securing, self-locking thread which secures a set rotational position between the screw part 21 and the clamping part 20.

Figure 5A:
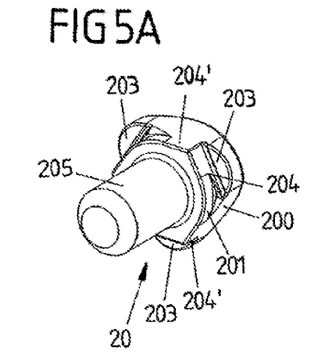
FIG. 5A shows a separate view of a clamping part of the fastening device according to a second exemplary embodiment.
Figure 5B:
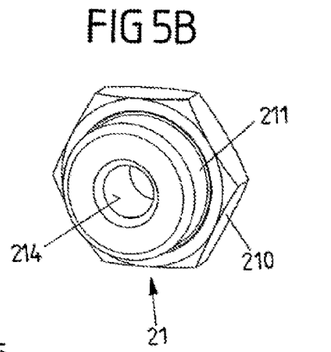
FIG. 5B shows a separate view of a screw part of the fastening device.
Figure 5C:
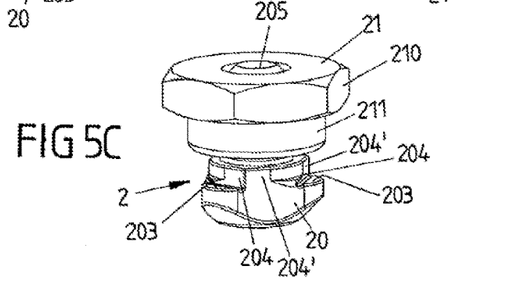
FIG. 5C shows a view of the fastening device with the screw part pre-mounted on the clamping part.

Another exemplary embodiment of a fastening device 2 is shown in FIGS. 5A-5C. In the case of said exemplary embodiment, the clamping part 20 comprises a threaded shank 205 which is to be moved into screw-engagement with a threaded opening 214 of the screw part 21. In the case of said exemplary embodiment, the clamping part 20 is consequently developed in the manner of a screw, whilst the screw part 21 is realized as a nut. A place for the tool to engage on the screw part 21 is formed, in this connection, by a hexagonal form of the head 210 of the screw part 21.

The fastening device 2 of said exemplary embodiment is otherwise identical in its functioning to the previously described exemplary embodiment.

Figure 6A:
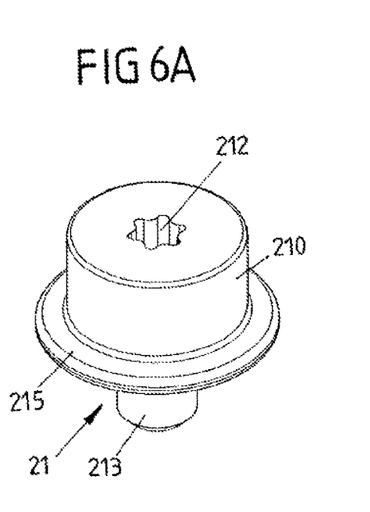
FIG. 6A shows a separate view of a clamping part of a fastening device according to a third exemplary embodiment.
Figure 6B:
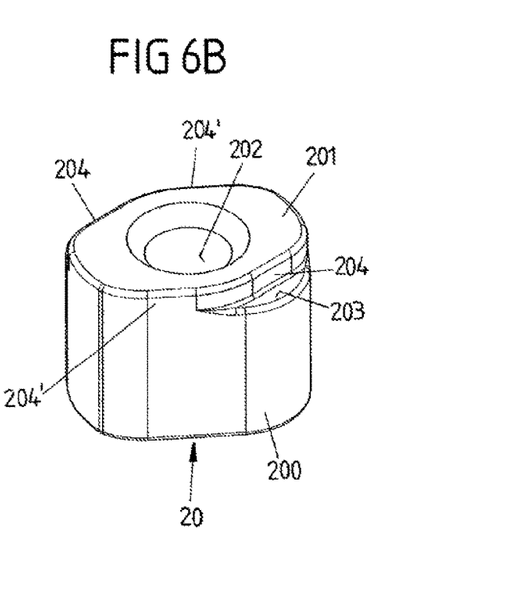
FIG. 6B shows a separate view of a clamping part of the fastening device.
Figure 6C:
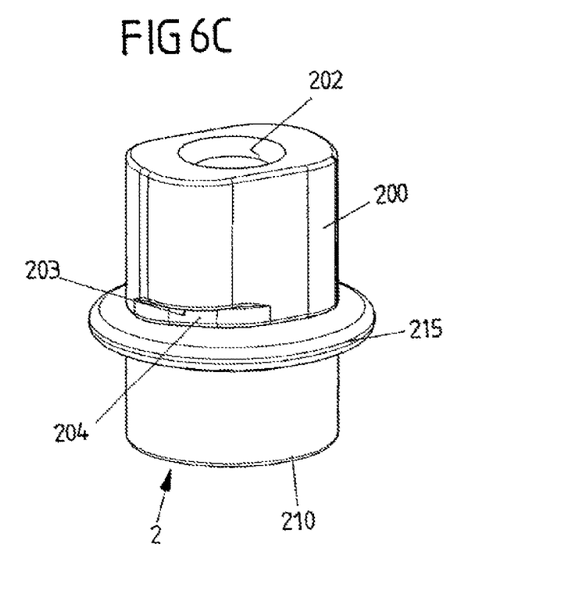
FIG. 6C shows a view of the fastening device with the screw part pre-mounted on the clamping part.

In the case of the exemplary embodiment of a fastening device 2 shown in FIGS. 6A-6C, the clamping part 20 comprises an elongated, rounded form on its head 200. The head 200 carries a threaded opening 202 into which the screw part 21 is able to be screwed by way of a threaded shank 213. An engagement portion 201, which realizes stop portions 204, 204' and, with the fastening device 2 mounted (see FIG. 7C), comes to rest in an opening 101 of a component 10 of a vehicle seat, is arranged on the head 200.

The screw part 21 comprises a head 210 and a clamping portion 215 which is arranged thereon and is in the form of a ring-shaped, circumferential connected unit. A place for the tool to engage 212 is realized on the head 210 for the engagement of, for example, a screwdriver.

The fastening device 2 of the exemplary embodiment according to FIGS. 6A to 6C serves as a stop for a longitudinal adjustment device of a vehicle seat and can be inserted into an opening 101 on a bottom of a guide rail 10 which realizes the component. In a manner known per se, the guide rail 10 comprises several openings 101 which are offset longitudinally with respect to one another and serve as engagement points for locking elements which are arranged on an angle bracket 12 such that the angle bracket 12 is able to be locked with the guide rail 10 by means of the locking elements. The angle bracket 12 is secured on an upper, other guide rail (not shown) such that the upper, other guide rail is able to be locked with the lower guide rail 10 by means of the angle bracket 12.

Figure 7A:
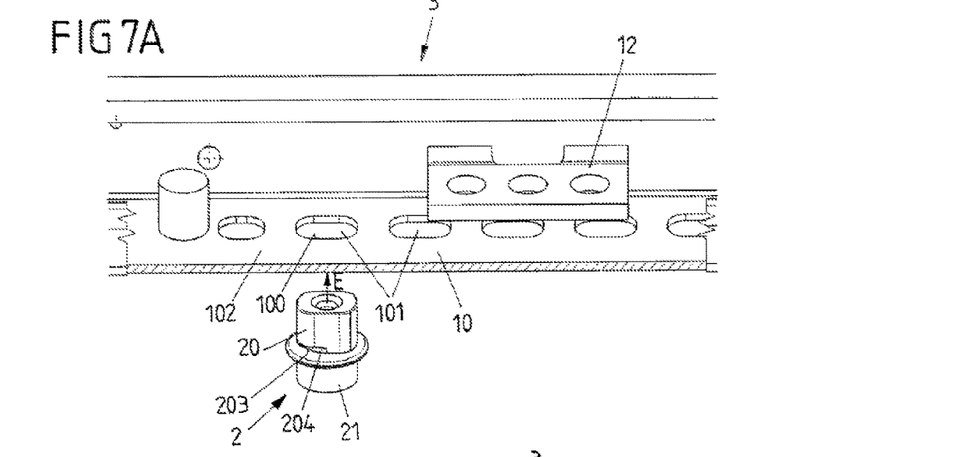
FIGS. 7A-7C show views when fitting the fastening device of the third exemplary embodiment onto a guide rail of a longitudinal adjustment device.
Figure 7B:
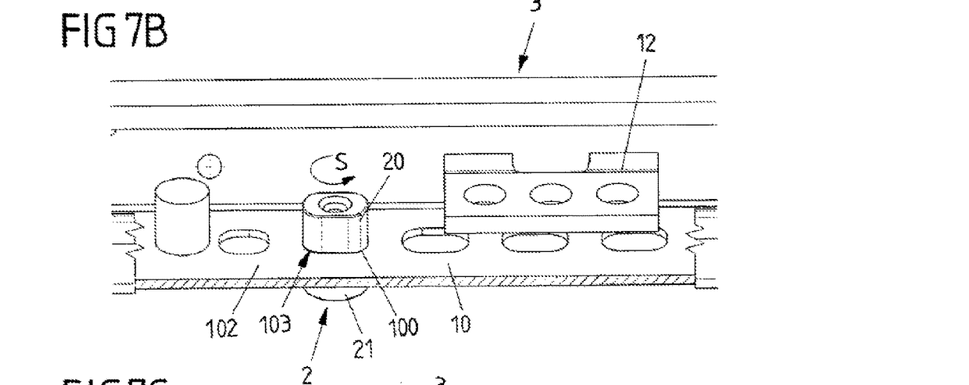
Figure 7C:
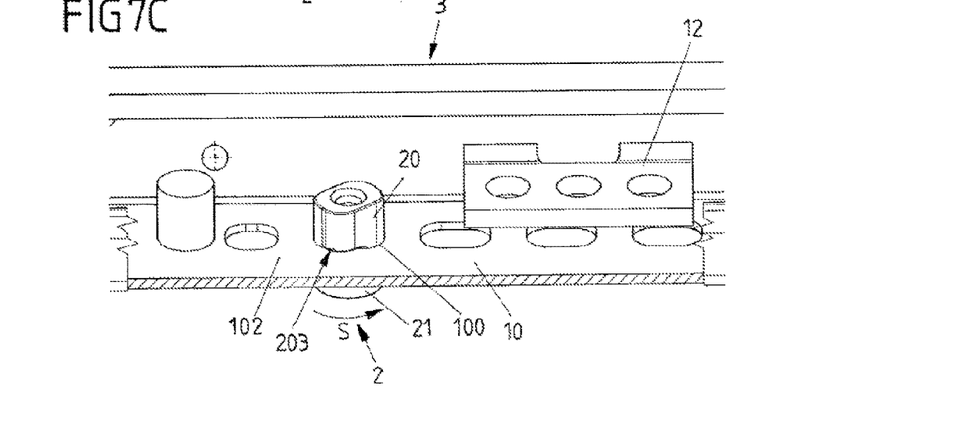

As a result of inserting the fastening device 2 into one of the openings 101, a stop can be created in a variable manner for delimiting the adjustment path of the angle bracket 12 relative to the guide rail 10. To this end, the fastening device 2 is inserted in a direction of insertion E into one of the openings 101 (FIG. 7A) and is then rotated in a direction of rotation S relative to the guide rail 10 as a result of engagement with the screw part 21 such that the clamping part 20 passes into a rotational position relative to the opening 101, in which position the clamping portions 203 are in abutment with the guide rail 10 and the clamping part 20 is consequently held on the guide rail 10 in opposition to the direction of insertion E (FIGS. 7B and 7C). As a result of screwing the screw part 21 further into the clamping part 20, clamping can then be produced between the screw part 21, the clamping part 20 and a wall portion 102 of the guide rail 10 positioned between the screw part 21 and the clamping part 20 in order to connect the fastening device 2 in a clamping manner to the guide rail 10.

Figure 8:
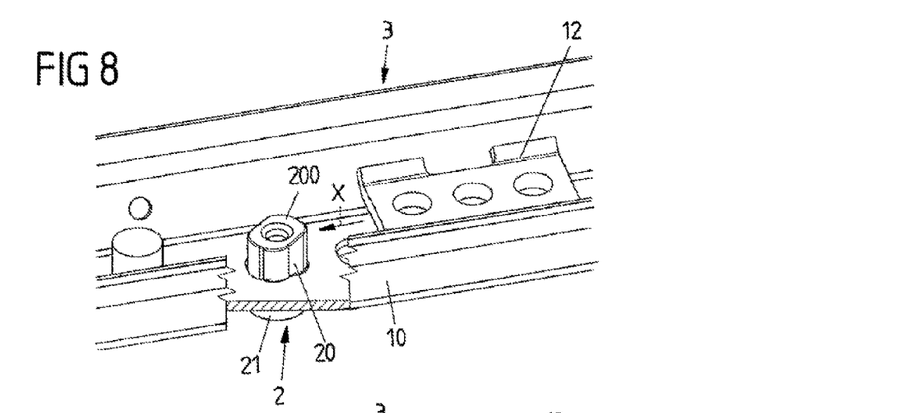
FIG. 8 shows a view of a fastening device fitted onto a guide rail with a manually actuatable longitudinal adjustment device.

As can be seen in FIG. 8, with the fastening device 2 fastened on the guide rail 10, the clamping part 20 projects along the guide rail 10 into an adjustment path X of the angle bracket 12. The angle bracket 12 can consequently not be moved along its adjustment path X beyond the clamping part 20 such that the adjustment path X of the angle bracket 12, and consequently the upper guide rail which is connected to the angle bracket 12, is delimited by the fastening device 2.

If a different path section is desired, the fastening device 2 can be inserted into a different opening 101.

The shaping of the head 200 of the clamping part 20 is preferably such that, when the adjustment part (angle bracket 12, 13) acts upon the head 200, no torque is generated along the direction of rotation S or a torque is generated in the direction of rotation S, but not, however, a torque in opposition to the direction of rotation S. As a result, the hold of the fastening device 2 on the guide rail 10 is not impaired by the adjustment part (angle bracket 12, 13) being knocked against the head 200 or is even strengthened by it such that the fastening device 2 is not able to be detached in operation without actuating the screw part 21.

Figure 9:
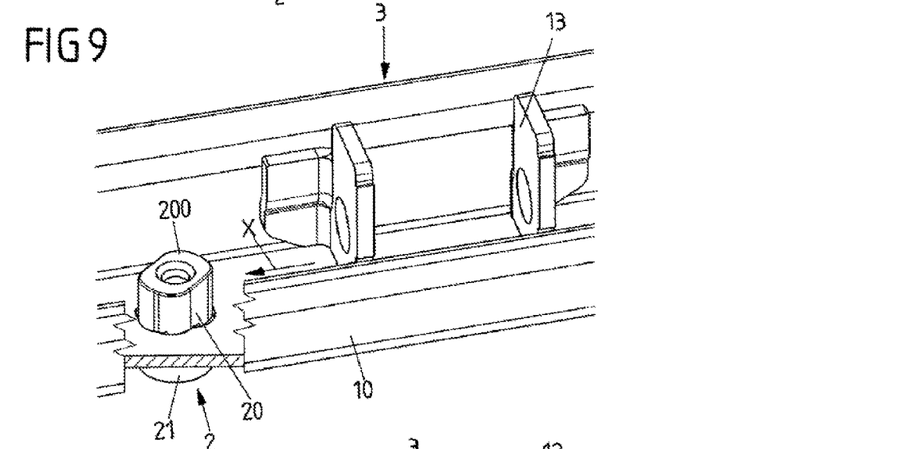
FIG. 9 shows a view of a fastening device fitted onto a guide rail with a longitudinal adjustment device which is to be adjusted by motor.

The longitudinal adjustment device according to FIGS. 7A to 7C and 8 is developed as a manually actuatable longitudinal adjustment device. The fastening device 2, however, can also be used likewise for path delimiting in the case of a longitudinal adjustment device that can be motor-driven, where, for example, a transmission that is driven by electric motor is arranged on an angle bracket 13 shown in FIG. 9 and is secured on an upper guide rail by means of the angle bracket 13.

Figure 10:
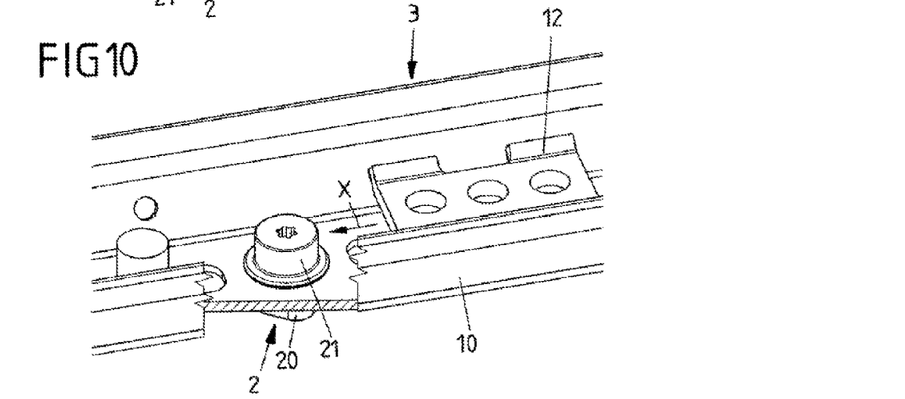
FIG. 10 shows a view of a fastening device which is fitted on the guide rail the other way around compared to the arrangement according to FIG. 8

Finally, it is also conceivable to fit the fastening device 2 the other way around on the guide rail 10 in such a manner that the screw part 21 projects into the adjustment path X of the part to be adjusted (angle bracket 12, 13). This is shown in FIG. 10. Nothing changes as a result in the functioning of the fastening device 2.

The concept underlying the invention is not restricted to the previously depicted exemplary embodiments, but can also be realized, in principle, in the case of quite different types of embodiments.

In particular, a fastening device of the type described here is also usable in quite a different type of manner on a vehicle seat for connecting two parts, for providing a stop or the like.

A quick fastener, which is able to be secured on a component in a simple manner without any great auxiliary means and in the mounted position provides a secure hold, is created and provided by means of the fastening device described here. In particular, "single-handed assembly" is possible. Such a fastening device can be produced in a cost-efficient manner and does not require any threaded passages, weld nuts or rivet nuts.

LIST OF REFERENCES

1 Assembly
10, 11 Component
100, 110 Opening edge
101, 111 Opening
102 Wall portion
11 Pivot element
110 Opening edge
111 Opening
12, 13 Angle bracket
2 Fastening device
20 Clamping part
200 Head
201 Engagement portion
202 Threaded opening
203 Clamping portion
204, 204' Stop portion
205 Threaded shank
21 Screw part
210 Head
211 Bearing portion
212 Tool engagement point
213 Threaded shank
214 Threaded opening
215 Clamping portion
3 Longitudinal adjustment device
A Outside circle
D Diameter
G Thread
I Inside circle
K Contour
S Direction of rotation
X Adjustment path

The invention claimed is:

1. An assembly of a vehicle seat, comprising
a component which comprises an opening which is delimited by an opening edge, and
a fastening device which is to be secured on the component and comprises a clamping part and a screw part which is to be connected in a screwing manner to the clamping part, wherein the clamping part comprises at least one clamping portion, is insertable into the opening in a direction of insertion and is connectable to the component in a clamping manner as a result of screw-connecting the screw part to the clamping part,
wherein in a first rotational position the clamping part is insertable into the opening and, for clamping with the component, is rotatable in a direction of rotation about the direction of insertion from the first rotational position into a second rotational position, in which the at least one clamping portion of the clamping part is movable into abutment with a wall portion of the component, which surrounds the opening, wherein the clamping part comprises at least one stop portion which, in the second rotational position, is in abutment with the opening edge of the opening and blocks the clamping part from being rotated in the direction of rotation beyond the second rotational position,
wherein one of the clamping part and the screw part comprises a threaded opening and the other of the clamping part and the screw part comprises a threaded shaft screw-connectable with said threaded opening,
wherein in a pre-mounted position the screw part is fitted onto the clamping part in that the threaded shaft engages the threaded opening for inserting the clamping part into said opening of said component, the clamping part being rotatable from the first rotational position into the second rotational position together with the screw part by acting onto the screw part,
wherein, upon the clamping part having reached the second rotational position, the screw part is rotatable further in said direction of rotation relative to the clamping part for establishing a clamping action between the clamping part, the component and the screw part.

2. The assembly as claimed in claim 1, wherein the opening edge delimits the opening circumferentially about the direction of insertion.

3. The assembly as claimed in claim 1, wherein the clamping part comprises a head, the form of which, in cross section transversely with respect to the direction of insertion, corresponds to the form of the opening of the component.

4. The assembly as claimed in claim 3, wherein the head of the clamping part and the opening of the component, in cross section transversely with respect to the direction of insertion, comprise a substantially triangular form.

5. The assembly as claimed in claim 3, wherein the at least one clamping portion is arranged on a side of the head which faces the wall portion of the component when the clamping part is inserted into the opening.

6. The assembly as claimed in claim 1, wherein at least one of the clamping part and the screw part comprise a trilobular thread.

7. The assembly as claimed claim 1, wherein the screw part comprises a clamping portion, wherein, with the clamping part inserted into the opening, the clamping portion of the screw part comes to rest against a first side of the wall portion and the at least one clamping portion of the clamping part against a second side of the wall portion which is remote from the first side such that the wall portion is received between the clamping portion of the screw part and the at least one clamping portion of the clamping part.

8. The assembly as claimed in claim 1, wherein the clamping part comprises at least one further second stop portion which is in abutment with the opening edge of the opening in the first rotational position and blocks the clamping part from being rotated in opposition to the direction of rotation beyond the first rotational position.

9. The assembly as claimed in claim 1, wherein the fastening device is realized for pivotably mounting a pivot element on the component.

10. The assembly as claimed in claim 9, wherein the screw part comprises a bearing portion for pivotably mounting the pivot element on the component.

11. The assembly as claimed in claim 1, wherein the fastening device realizes a stop for delimiting an adjustment path of an adjustment device, the component being a constituent part thereof.

12. The assembly as claimed in claim 11, wherein the screw part or the clamping part projects into the adjustment path of an adjustment part and, as a result, delimits the adjustment path.

13. A method for mounting an assembly of a vehicle seat, wherein the assembly comprises a component which comprises an opening which is delimited by an opening edge, and a fastening device which is to be secured on the component and comprises a clamping part and a screw part which is to be connected in a screwing manner to the clamping part, wherein the clamping part comprises at least one clamping portion, is insertable into the opening in a direction of insertion and is connected to the component in a clamping manner as a result of screw-connecting the screw part to the clamping part, wherein in a first rotational position, the clamping part is inserted into the opening and, for clamping with the component, is rotated in a direction of rotation about the direction of insertion from the first rotational position into a second rotational position, in which the at least one clamping portion of the clamping part is movable into abutment with a wall portion of the component, which surrounds the opening, wherein when the clamping part is rotated into the second rotational position, at least one stop portion of the clamping part moves into abutment with the opening edge of the opening and, as a result, blocks the clamping part from being rotated in the direction of rotation beyond the second rotational position, and when the clamping part is situated in the second rotational position, the fastening device is secured in a clamping manner on the component as a result of further rotating the screw part in the direction of rotation relative to the clamping part.

\* \* \* \* \*